H. FRANK.
Bricks for Constructing Metallurgic Furnaces.
No. 134,374.
Patented Dec. 31, 1872.
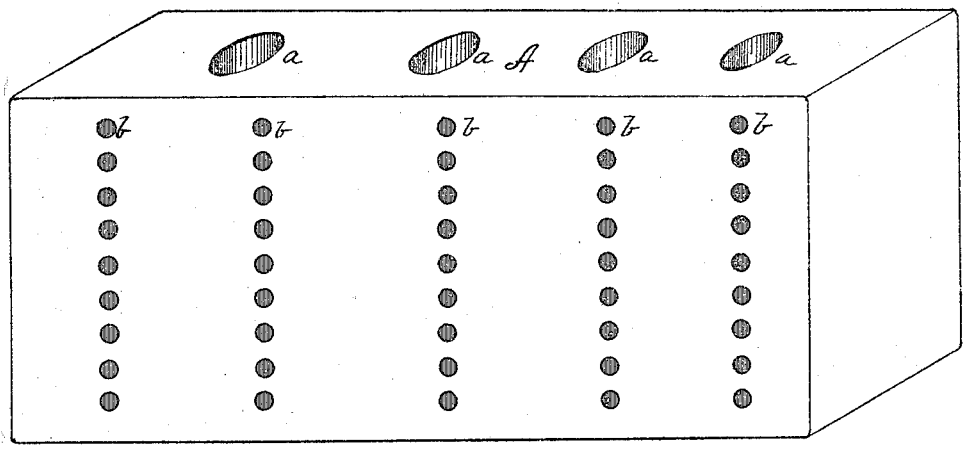

UNITED STATES PATENT OFFICE.

HIMAN FRANK, OF PITTSBURG, PENNSYLVANIA.

IMPROVEMENT IN BRICKS FOR CONSTRUCTING METALLURGIC FURNACES.

Specification forming part of Letters Patent No. 134,374, dated December 31, 1872.

*To all whom it may concern:*

Be it known that I, HIMAN FRANK, of Pittsburg, in the county of Allegheny and State of Pennsylvania, have invented a new and useful Improvement in Bricks for Building Regenerative and other Furnaces; and I do hereby declare the following to be a full, clear, and exact description thereof, reference being had to the accompanying drawing forming a part of this specification, which represents in perspective my improved brick or tile for building heating-chambers for metallurgic and other furnaces, hot-blasts, and furnaces for heating buildings.

To enable others skilled in the art to make and use my invention, I will describe its construction and manner of use.

The brick or tile A is made of a refractory material, and is formed in a mold of proper shape, having cores running across it to form the openings *a*. When the material has become "set" the small holes *b* are made by means of a hollow cutter or tube. The brick is then baked or hardened in the usual way.

In the furnaces, &c., above mentioned gas and air are heated by passing them through walls heated by a current passing in an opposite direction.

This brick is designed for the construction of such walls, the openings *a* and *b* being made for the passage of the counter-currents.

The form of the brick and the number of the counter-openings may be varied to suit the circumstances under which the brick is to be used.

What I claim as my invention, and desire to secure by Letters Patent, is—

The tile or brick A having openings or passages *a* and *b*, substantially as described.

In testimony whereof I, the said HIMAN FRANK, have hereunto set my hand.

HIMAN FRANK.

Witnesses:
    A. S. NICHOLSON,
    THOS. B. KERR.